(No Model.) 6 Sheets—Sheet 3.

N. L. BISHOP.
CAN SOLDERING AND TESTING PLANT.

No. 531,501. Patented Dec. 25, 1894.

WITNESSES:
Chas. Nida.
Fred Acker

INVENTOR
N L Bishop
BY
Munn & Co
ATTORNEYS.

(No Model.) 6 Sheets—Sheet 6.

N. L. BISHOP.
CAN SOLDERING AND TESTING PLANT.

No. 531,501. Patented Dec. 25, 1894.

WITNESSES:

INVENTOR
N. L. Bishop
BY
ATTORNEYS.

UNITED STATES PATENT OFFICE.

NOAH L. BISHOP, OF WASSAIC, ASSIGNOR TO THE NEW YORK CONDENSED MILK COMPANY, OF NEW YORK, N. Y., A CORPORATION OF NEW JERSEY.

CAN SOLDERING AND TESTING PLANT.

SPECIFICATION forming part of Letters Patent No. 531,501, dated December 25, 1894.

Application filed July 25, 1894. Serial No. 518,515. (No model.)

*To all whom it may concern:*

Be it known that I, NOAH L. BISHOP, of Wassaic, in the county of Dutchess and State of New York, have invented a new and Improved Can Soldering and Testing Plant, of which the following is a full, clear, and exact description.

My invention relates to a can-soldering and testing plant, and it has for its object to provide a plant for the above-named purpose, in which soldering, testing and, if desired, labeling machines will be connected in such manner that a can partially formed and entered at one end of the series of machines, will be automatically carried through the various machines and delivered from the final one completely finished, and labeled if desired.

Another object of the invention is to provide for a plant of the character above set forth an initial feed device, which will supply the cans to be soldered to the final soldering machine, and consequently to the other machines in the train as rapidly as said machines can manipulate the cans, and to so construct this feed mechanism that it will be exceedingly simple, durable and economic in its construction, and whereby it will not clog although being provided with many branches.

A further object of the invention is to provide novel connections between the several machines constituting the plant, whereby the cans are led from one to the other, and also a means whereby the soldered cans will be cooled in a thorough and expeditious manner while passing from one machine to another.

The invention consists in the novel construction and combination of the several parts, as will be hereinafter fully set forth and pointed out in the claims.

Reference is to be had of the accompanying drawings, forming a part of this specification, in which similar figures and letters of reference indicate corresponding parts in all the views.

Fig. 1$^a$ is a section taken transversely on the line $a$—$a$ of Fig. 1. Fig. 1$^b$ is a section taken essentially on the line $b$—$b$ of Fig. 1. Fig. 2$^a$ is a section taken substantially on the line $a$—$a$ of Fig. 2. Fig. 2$^b$ is a section taken substantially on the line $b$—$b$ of Fig. 2. Fig. 6 is a side elevation and partial sectional view of the assembling device of the plant. Fig. 7 is a cross section through the uppermost of the initial feed chutes, illustrating a portion of the lift device for the gate contained therein; and Fig. 8 is a horizontal section through the main portion of the can-testing machine forming a portion of the plant.

Figure 1:
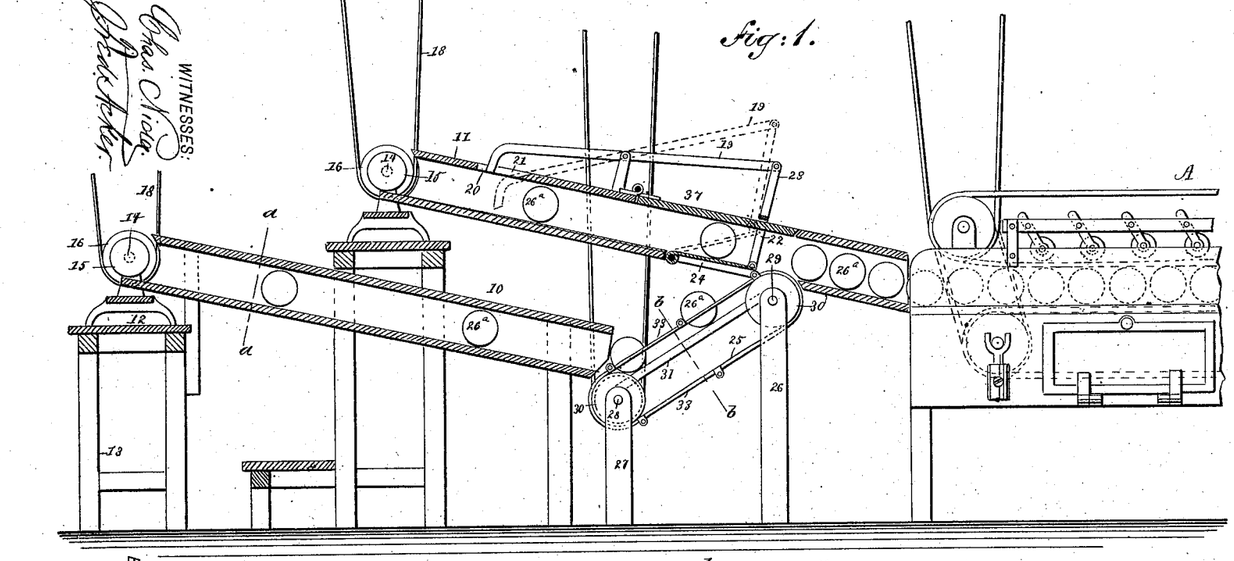
Figure 1 is a sectional view of the feeding device for the improved plant, illustrating a portion likewise of the first or initial soldering machine.

The main or initial feed device for the plant, as shown in Fig. 1, is located in front of the first machine A of the plant, or at one end of said machine, the machine being preferably one adapted to apply resin to the head of the can first to be soldered to the body, since the cans when entered into the feed device comprise a body portion previously soldered, and two heads located loosely one upon each end of the body. This feed device consists primarily of two chutes 10 and 11, one being located below the other, and the chutes may be separated as far as may be desired, or one may be immediately over the other. The receiving end of each chute is made to rest upon a table 12, the said table being supported by suitable standards 13, and upon each of these tables at one side of each chute a spring-controlled shaft 14 is located, having sliding as well as rotary motion, and opposite each shaft 14 a rotary shaft 14$^a$ is journaled, as shown in Fig. 6. Each shaft at its inner end is made to carry a disk 15, and the shaft 14$^a$ has a pulley 16 driven by a suitable belt 18. The sliding shaft 14 is moved to and from the other by means of a foot treadle 16$^a$, or by equivalent means, the said treadle being connected with a suitable shifting lever 16$^b$. I desire it, however, to be distinctly understood that the devices just described as located at the receiving end of the chute constitute no portion of my invention, as they are devices now commonly employed to insure the heads being properly placed upon the bodies of cans before they are conducted to soldering machines, the operation being accomplished by forcing the cans, with their heads on, between the opposing disks 15, and in one revolution of the disks the heads will have been fairly and squarely placed upon the body.

The upper chute 11 is provided with a cut-off lever 19, said lever being fulcrumed at or near its center upon the upper portion of the chute. The forward end of this lever, or that nearest the receiving end of the chute, is downwardly projected, as shown at 20 in Fig. 1, and is made to enter an opening 21, produced in the upper surface of the chute, whereby when the lower or opposite end of the lever is elevated, its upper or curved end will engage practically with the bottom of the chute, and cut off all communication between the space in the front and the space at the rear of the said curved section of the lever.

Preferably a yoke 22 is connected through the medium of a stem 23 with the lower or rear end of the cut-off lever 19, and the said yoke is attached to the free end of a gate 24, formed in the bottom of the said upper chute 11, at a predetermined point in its length, whereby when the gate 24 is carried upward in the chute it will prevent the cans back of it from passing to the delivery end of the chute, and the upper curved end of the lever will enter the chute at its receiving end to cut off communication between said end and that portion back of the gate; while when upward pressure is removed from the gate 24, said gate will drop from gravity and raise the curved end of the lever from the chute, permitting the cans to travel freely down the same.

The lower chute 10, is made to extend from the assembling device at its forward or receiving end, downward and rearward to a point ordinarily beneath, or substantially so, the hinged end of the gate 24 of the chute 11; and the rear end of the chute 10, is made to deliver its contents upon an elevator 25.

Figure 1A:
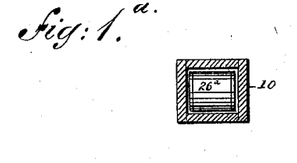

Each of the chutes, as shown in the cross section Fig 1ª, is preferably closed upon all sides, being open at both ends, and is of such shape and cross sectional area that it just neatly receives a can, designated in the drawings as 26ª, and therefore, prevents said can from assuming a diagonal position in the chute.

Figure 1B:
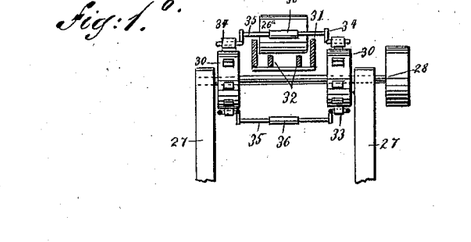

The elevator 25, is shown in cross section, as in Fig. 1ᵇ, and consists ordinarily of a rear set of standards 26, and a forward set of standards 27, the latter being of less height than the former; and in each pair of standards a shaft is journaled, the said shafts being designated respectively as 28 and 29, and each shaft is made to carry a sprocket wheel 30. Between the sprocket wheels a box 31 is supported, extending practically from the shaft 28 to the shaft 29, and the box is shown in Fig. 1ᵇ as provided with tracks 32 upon its bottom, the tracks being of considerably less height than the sides of the box proper; but said tracks may be omitted if in practice it is found desirable. An elevator is held to travel over each vertically aligning set of sprocket wheels 30, and said elevator consists of two link or chain belts 33, connected at predetermined intervals through the medium of angle bars or elbows 34 secured in sundry of the links, and connecting rods 35 passed through the vertical member of one elbow or angle rod to the other; and ordinarily the connecting rods 35 are provided with friction rollers 36 at their centers.

The upper chute 11 is usually provided with an upper door 37, as shown in Fig. 1, whereby in the event that any clogging of the feed should occur the said door can be opened and the cans set free, or whereby should a can be located between the gate and door when the latter is to be lifted, both will move together, holding the can between them. The upper end of the elevator 25 is made to enter the upper chute 11 immediately at the rear of the gate 24.

The upper chute 11, leads to the receiving end of a resin applying machine A of any approved construction, which, as heretofore stated, is the initial machine of the plant; and the said resin-applying machine A, is preferably one adapted to apply resin to but one head of the can.

Hitherto it has been found impossible to feed such a machine to its full capacity with a single chute, and when two chutes were employed the feed from one of them would interfere with that from the other; but under the construction above described and shown in Fig. 1, the two chutes may be brought into requisition without one interfering in the least with the other, and the machine A will be fed to its full capacity.

The operation of feeding is substantially as follows: The cans are placed between the assembling devices at the forward end of the chutes, and permitted to drop into the same. The cans in the lower chute roll down the same, and pass out at its inner or delivery end upon the elevator 25, being taken up, one after the other, by the several connecting bars 35; and as the cans are conveyed by the elevator to the upper chute 11, communicating with the resin-applying machine, the uppermost can will elevate the gate 24 in the upper chute, thereby depressing the curved end of the lever 19, as shown in dotted lines in Fig. 1, and prevent any more cans passing down the chute from its delivery end, while the can that had been in transit to the gate 24, will be held in the chute by the upper position of the gate, and the can carried upward by the elevator will be delivered without interruption to the delivery end of the said upper chute, whereupon the gate 24, will

Having thus described my invention, I claim as new and desire to secure by Letters Patent—

1. In a can-soldering machine, a feed device consisting of two troughs both adapted to receive and deliver cans, a conveyer connection between the two can troughs, and a stop mechanism located upon one of the troughs and operated through intervening mechanism by the cans carried by the conveyer, as and for the purpose specified.

2. In a plant for soldering or testing cans, a feed device, a resin-affixing machine connected with the feed device, a soldering machine, a conveyer connecting the two machines, a second conveyer leading from the soldering machine, and a testing machine automatically receiving the cans from the conveyer, substantially as set forth.

3. In a can-soldering machine, a feeding device, the same consisting of a chute, a second chute located above the first and in communication with the soldering machine, a gate located in the upper chute, a cut-off lever fulcrumed upon said chute, adapted to enter the same at one end and connected at the opposite end with said gate, and an elevator leading from the lower to the upper chute, as and for the purpose specified.

4. In can soldering machines, a feed device, consisting of a lower and an upper chute, the upper chute being in communication with the receiving end of the machine, the said upper chute being provided with a gate opening inward, a lever connected with the said gate, one end of which lever is adapted to enter the chute and constitute a barrier therein when the gate is open, and an elevator connecting the two chutes, the cans carried by the elevator operating upon the said gate to open the same, substantially as shown and described.

5. In can soldering machines, a lower chute, an upper chute connected with the receiving end of the said machine, a gate located in the bottom of the upper chute, opening upward, a cut-off lever, one end of which is connected with the said gate, the opposite end being adapted to enter the upper chute and form a barrier therein when the gate is raised, and an elevator located in rear of the lower chute, receiving the cans therefrom and entering the upper chute at the rear of its gate, the elevator being provided with elevating belts having connecting bars adapted as supports for cans, whereby the uppermost cans on the elevator operate to open the said gate and stop further passage of cans in the upper chute from its inlet end, substantially as described.

6. In a can-soldering machine, the combination, with the machine, a lower chute, an upper chute connected with the receiving end of the soldering machine, and assembling devices located at the receiving ends of the said chutes, both chutes being given an inclination in direction of the soldering machine, of a gate located in the bottom of the upper chute, a cut-off lever fulcrumed upon the upper chute, one end of which is curved downward to enter the chute and constitute a barrier, connecting rods uniting the opposite end of the said lever with the free end of the said gate, an elevator adapted to receive cans from the delivery end of the lower chute, said elevator entering the upper chute between the soldering machine and the gate of the said upper chute adjacent to said gate, the elevator consisting of endless chain belts traveling upon sprocket wheels, the belts being connected by cross bars provided with angled extensions at their ends, and a box-like bed located between the stretches of the chain belts, the connecting bars being adapted to receive and convey upward the cans while the bed constitutes a support therefor, as and for the purpose set forth.

7. In a plant for soldering cans, a feed device consisting of an upper and a lower chute, the upper chute being provided with a cut-off lever, a gate controlling said lever, and an elevator connecting the two chutes, adapted to assist in the elevation of the gate, a resin-applying machine connected with the upper chute, a soldering machine, and a chute connecting the resin-affixing and soldering machines, the said chute being constructed of a series of longitudinally placed bars located at predetermined intervals apart, whereby the least possible amount of frictional surface is presented to the cans having the resin applied and passing to the soldering machine, as and for the purpose specified.

8. In a plant for soldering cans, a feed device consisting of an upper and a lower chute, the upper chute being provided with a cut-off lever, a gate controlling said lever, and an elevator connecting the two chutes, adapted to assist in the elevation of the gate, a resin-applying machine connected with the upper chute, a soldering machine, and a chute connecting the resin-affixing and soldering machines, the said chute being constructed of a series of longitudinally-placed bars located at predetermined intervals apart, whereby the least possible amount of frictional surface is presented to the cans having the resin applied and passing to the soldering machine, and an elevator located at the delivery end of the soldering machine, a chute leading from the soldering machine to the elevator, a blast pipe located at the base of the elevator and adapted to cool the cans located thereon, and means, substantially as shown and described, for supplying air to the said blast pipe, as and for the purpose set forth.

Figure 2:
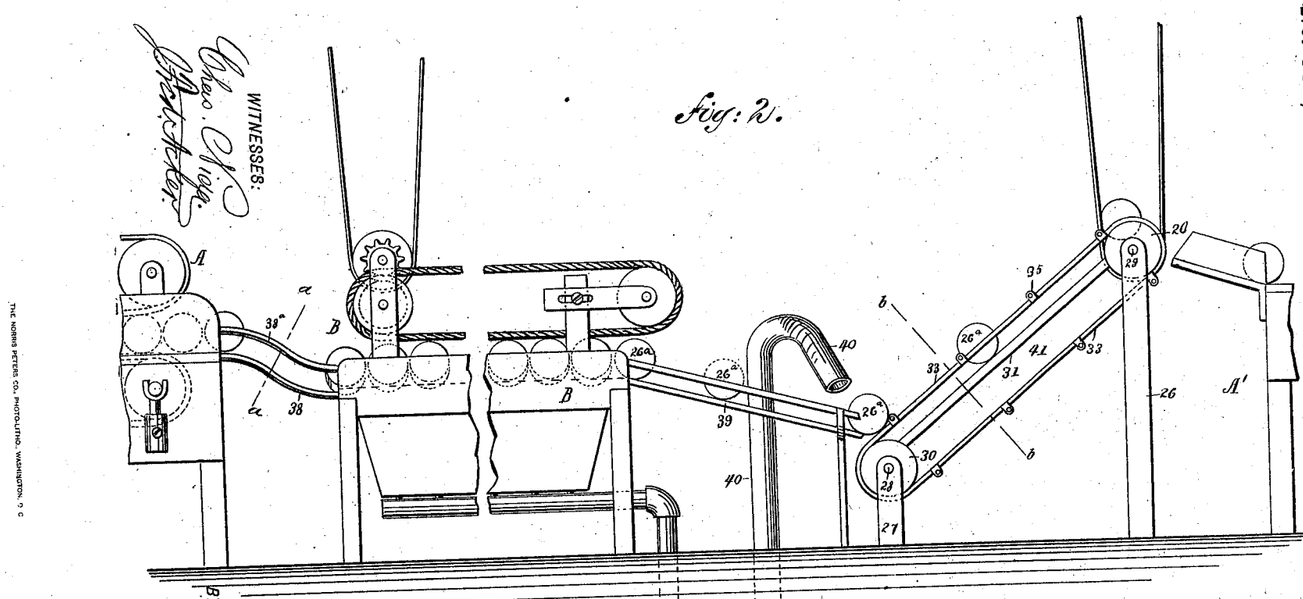
Fig. 2 is a continuation of the plant illustrated in Fig. 1.
Figure 2A:
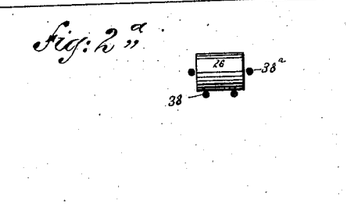
Figure 2B:
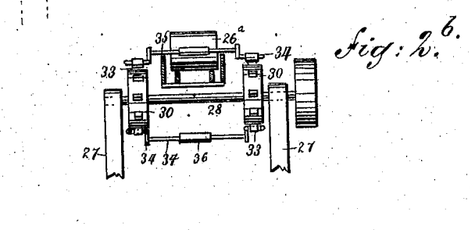
Figure 3:
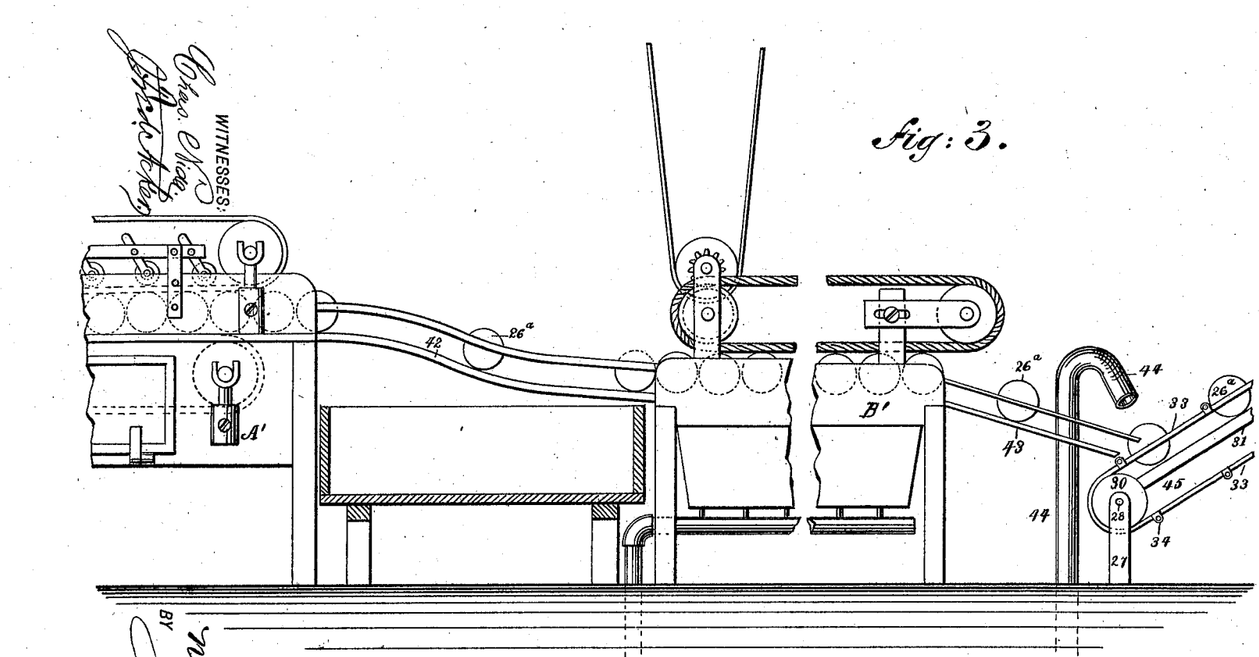
Fig. 3 is a continuation of the plant shown in Fig. 2.

9. In a plant for soldering and testing cans, a feed device, a resin-affixing machine connected with the feed device, a soldering machine, a conveyer connecting the two machines, a second conveyer leading from the soldering machine, an elevator connected with the said conveyer, an air blast located over the elevator, in position to cool material cardrop, and before the next can on the elevator can reach the gate to elevate it, the retarded can, or cans in the upper chute will have had time to pass to the delivery end thereof, or over the gate and beyond the entering end of the elevator. A machine B, is located at the rear of the resin-applying machine A, the said machine being a soldering machine of any approved character, and it is preferably so constructed as to solder the head to the body of the can to which the resin had been applied by the preceding machine. The cans, after having received the resin, are fed to the soldering machine through the medium of a chute 38, connecting the two machines and having a downward inclination; and the said chute, as illustrated in Fig. 2ª, is made up of a series of rods 38ª, whereby there is but little frictional surface brought in engagement with that portion of the can that has received the resin. A practically similar chute 39, is located at the delivery end of the soldering machine B, adapted to receive the cans after the head spoken of has been soldered upon the body; and at the delivery end of this second chute 39 a pipe 40, is preferably permanently located, connected with a blower, or other source of air supply, and the pipe is so shaped that a blast of air will be directed upon, for example, the cans at the lower end of the chute 39, and thus quickly cool them, and provide for an exceedingly short chute. The air blast pipe 40 is so constructed that it will be brought over the edge or seam of the head of the can just soldered, and the air blast will extend nearly around the can, that portion not reached being subjected to the blast when the can is moved by an elevator to be hereinafter described. The cans, after leaving the chute 39, are delivered to an elevator 41, shown in cross section in Fig. 2ᵇ, and it preferably has the same details of construction as that shown in Fig. 1ᵇ, and therefore, the same reference numerals will be applied to the several parts.

The elevator 41, having its connecting bars 35 arranged at quite a distance apart, admits of a can resting upon the bottom portion of the elevator a sufficient length of time to have the solder thoroughly cooled by the air blast from the pipe 40. The elevator 41, delivers the cans to a chute leading to another resin-applying machine A', adapted to apply solder to the head which is yet simply clamped upon the can, and a chute 42, of the same character as the chutes 38 and 39, is made to connect the second resin-applying machine A', with a second soldering machine B', adapted to solder the heads to which the resin is applied; and another chute 43, receives the completely soldered cans from the last soldering machine. The said cans are then cooled by means of an air-blast delivered through the pipe 44, the equivalent of the pipe 40, and an elevator 45, of like construction to the elevators 41 and 25, receives the finished cans and conducts the same to a trough 46, the receiving end of the trough being inclined, and its delivery end substantially horizontal and closed except at one side of the trough, which is provided with an opening 47. A testing machine C, is located at the opening 47 in this trough 46, and the said testing machine is preferably of that character known as vacuum machines, and comprises an upright 48 and arms 49, held to revolve around the upright. The upright is hollow and connected with a vacuum pump or other apparatus adapted to exhaust air from its interior, and the said upright is provided with a port 50 in one side, of sufficient length, for example, to register with three of the arms of the testing machine, as shown in Fig. 8, and the said upright is further provided with a channel 51 in its interior, communicating with the outside atmosphere and adapted to register with the various arms as they are revolved. In the operation of this portion of the machine, when an arm 49 arrives at the end of the delivery chute 46 it will be in registry with the port 50, and will at the same time be made to engage at its upper end with the end of the can containing the usual cap opening, and the section brought to bear upon the arm will hold the can firmly thereto. When the port 50 is of the length shown in Fig. 8, the suction will be acting upon three arms simultaneously, one just receiving a can and the two preceding ones, which have already received cans.

In the revolution of the arms, those carrying the cans will be made to travel around the closed portion of the upright, and consequently, if any of the cans carried are imperfect they will leak air, the suction will be destroyed and the cans will fall from the arms. The cans that are perfect, however, will remain upon the arms until they are brought in registry with the air-supply channel 51, and the air entering the arm at this time will cause the can to fall. The perfect can in falling will be received by a conveyer D, whereupon the can will be conducted thereby to the main conveyer E, to be carried for example to a machine for the affixing of a label, or labels, or to a party or parties employed to do such work.

Figure 4:
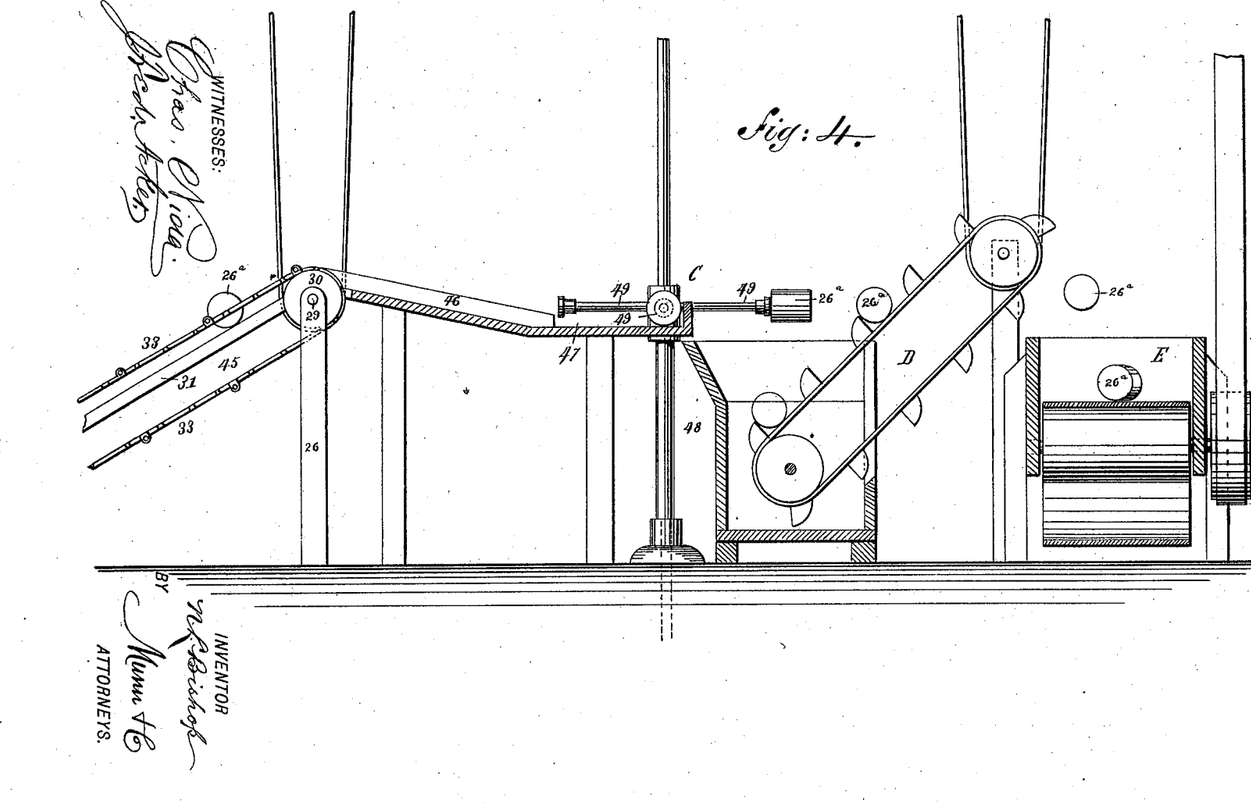
Fig. 4 is a continuation of the plant as shown in Fig. 3, the said view being a sectional one.
Figure 5:
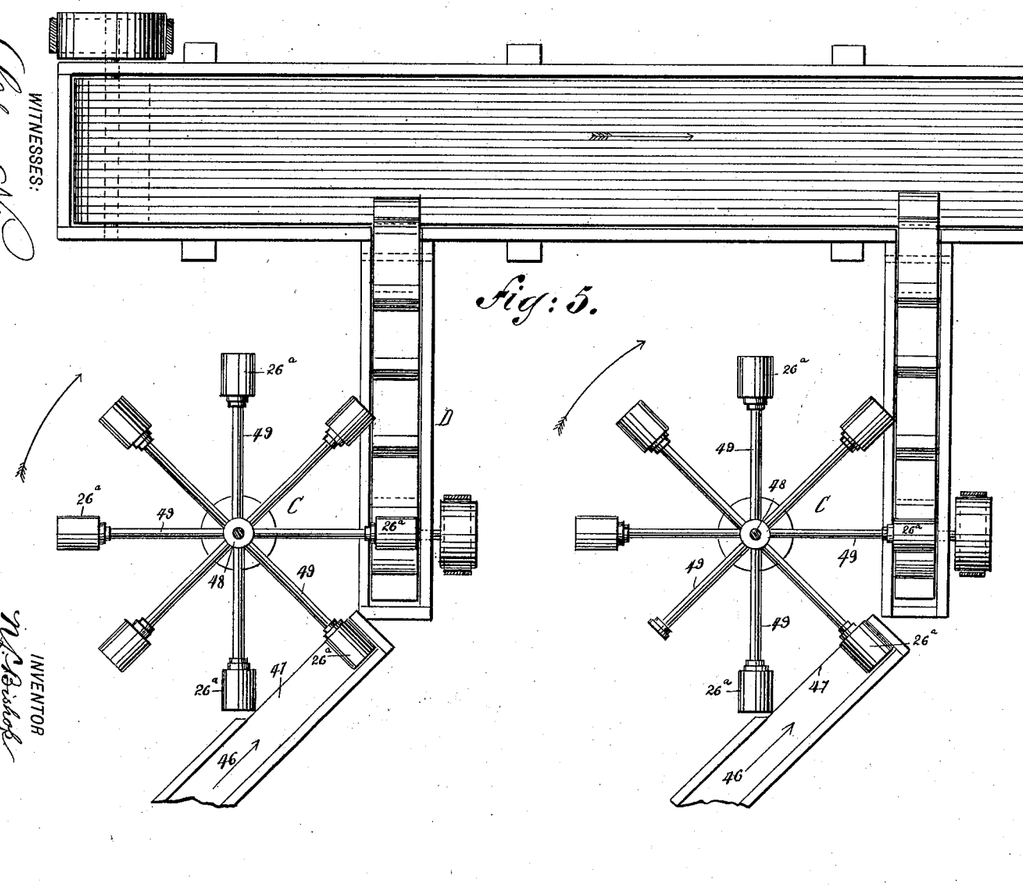
Fig. 5 is a plan view of the plant, illustrating substantially the same construction as shown in Fig. 4, with the exception that two testing machines instead of one are illustrated as connected with the conveyer.

In Fig. 4 I have illustrated a single testing machine receiving for example the cans from one plant, but cans may be conducted from one plant to two testing machines if so desired.

A machine of the character above set forth is exceedingly simple, it is durable and it is economic, and after a can has been introduced at the initial end of the plant it is automatically taken care of and is delivered, completed and tested at the opposite end, without any interference whatsoever; and under the above system of grouping machines, the work of completing and testing may be much more expeditiously, conveniently and effectually carried on than under the systems at present in use.

ried thereby, a receiver to which the material from the elevator is delivered, and a testing machine supplied from the said receiver, as and for the purpose specified.

10. In a plant for soldering and testing cans, a feed device, substantially as described, provided with a cut-off operated by the cans being fed, and a resin affixing and soldering machine connected with the said feed device, an elevator receiving the cans from the soldering machine, an air blast located over the elevator for the purpose described, a trough receiving the material from the elevator, a testing machine receiving the material from said trough, an elevator receiving the cans from the testing machine, and a conveyer to which the cans are finally delivered, as and for the purpose specified.

11. In a can-soldering machine, a feeding device consisting of troughs each adapted to receive cans and one of them being provided with a gate, and a cut-off lever connected with the gate and operated therefrom, and an elevator establishing communication between the two troughs, the cans carried by the elevator serving to operate the gate and cut-off lever, as and for the purpose specified.

NOAH L. BISHOP.

Witnesses:
CHARLES E. LEWIS,
EDWARD BROWN.